(No Model.)

G. S. MOLER.
PHOTOGRAPHIC CAMERA.

No. 416,938. Patented Dec. 10, 1889.

WITNESSES:
N. R. Davis
C. Sedgwick

INVENTOR:
George S. Moler
BY
Munn & Co.
ATTORNEYS.

UNITED STATES PATENT OFFICE.

GEORGE S. MOLER, OF ITHACA, NEW YORK.

PHOTOGRAPHIC CAMERA.

SPECIFICATION forming part of Letters Patent No. 416,938, dated December 10, 1889.

Application filed March 16, 1889. Serial No. 303,544. (No model.)

*To all whom it may concern:*

Be it known that I, GEORGE S. MOLER, of Ithaca, in the county of Tompkins and State of New York, have invented new and useful Improvements in Photographic Cameras, of which the following is a full, clear, and exact description.

This invention mainly relates to photographic cameras more especially designed for instantaneous or detective work and in which provision is made for storing within and manipulating for exposure—that is, one at a time—a series of dry-plates; and the invention more particularly has for its object the taking of a succession of photographs in a camera of this description with great rapidity and ease and to provide for using the plates in irregular order, if desired, and with but little more trouble than when using them in their regular order.

The invention includes a plate-holder adapted to slide in the camera, as a drawer, and provided with hinged frames or leaves carrying the plates; also, a combination and arrangement of parts by which the general plate-holder is made to move backward as the plates are swung up into position, and so that the distance from the lens of the instrument to the plate in exposing position remains constant and regular in timely relation with the protecting-shutter, all as hereinafter described, and pointed out in the claims.

Reference is to be had to the accompanying drawings, forming a part of this specification, in which similar letters of reference indicate corresponding parts in all the figures.

Figure 1:
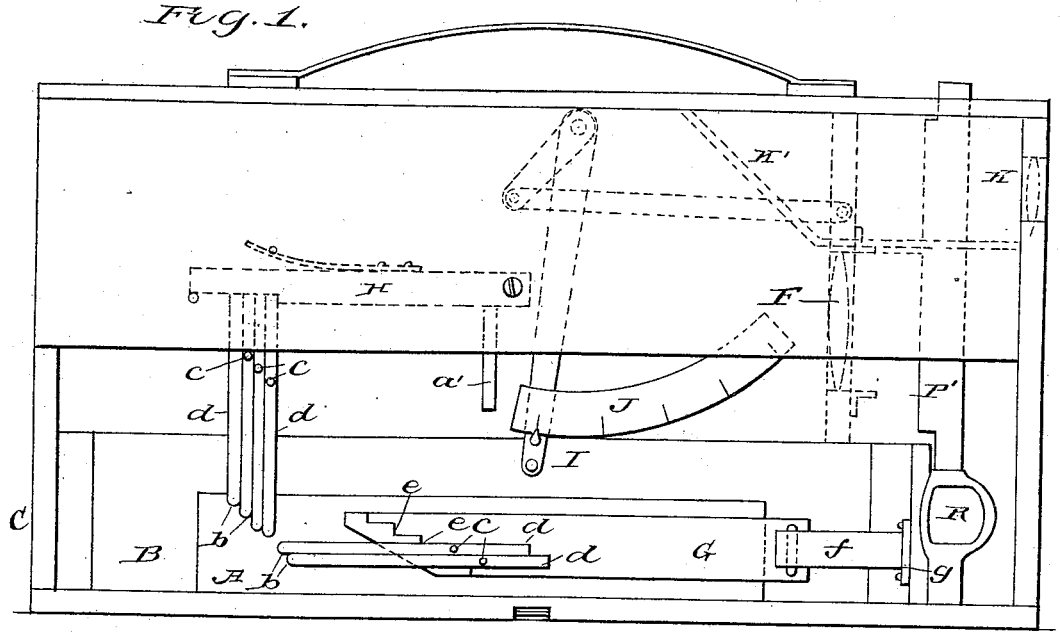
Figure 2:
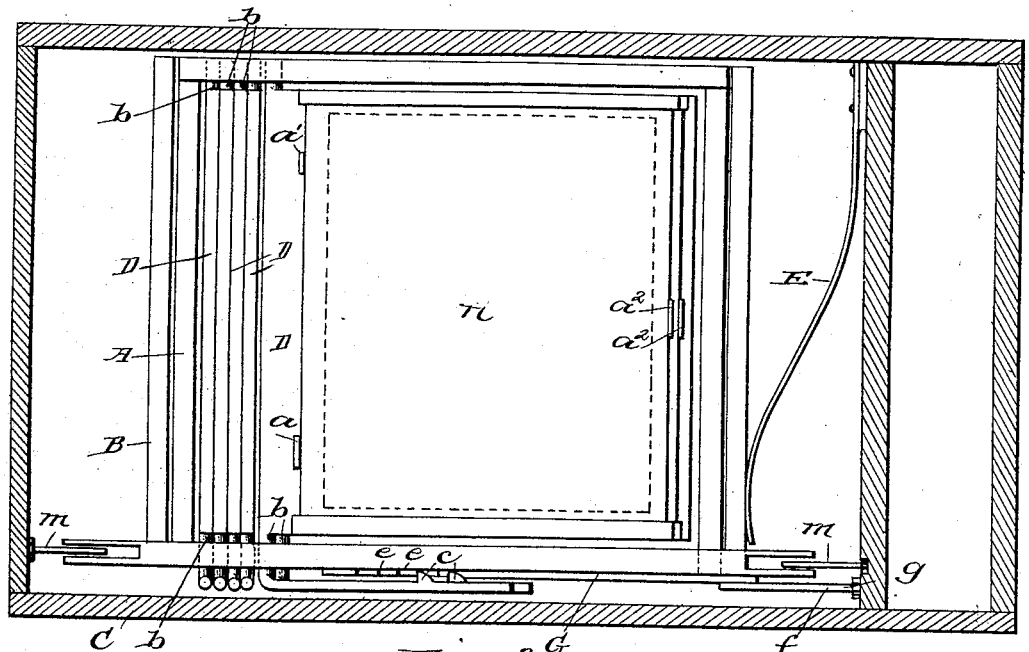
Figure 3:

Figure 1 is a side elevation of a photographic camera in part embodying my invention and with one of its sides partly open or in section to expose certain interior details; Fig. 2, a horizontal section mainly in illustration of the plate-holder and its plate-carrying frames; and Fig. 3 is a transverse section, upon a reduced scale, of a plate-holding swinging frame with a plate shown by dotted lines therein.

A is the plate-holder, which is contained within a sliding frame B in the bottom of the camera-box C.

D D represent the series of sensitized plate-carrying frames, hinged or pivoted at their one end or below, as at $b$ $b$, in step fashion relatively to each other to the sliding frame and each provided with lips $a$ $a'$ $a^2$ to keep the plate from sliding out or in, said frame being made of sheet metal, so that the lip $a^2$ can readily be sprung back to let the plate out past it, and said frame being provided with turned-over flanges $b'$ $b'$ to receive the side edges of the plate within it.

E is a spring which presses on the sliding frame B to force it back or away from the lens F of the camera when liberated for the purpose. Each plate-carrying frame D is provided with a handle $d$ at one of its pivot ends $b$. These handles are furnished with projections or stops $c$, that, when the handles are thrown down and the plate-carrying frames occupy a horizontal position, engage with a plate G, having notches or steps $e$ in it for the purpose. This plate G is connected by a hooking-spring $f$ with a fixed upright $g$, and so may be said to occupy a stationary position, whereby when any one of the handles $d$ by its stop $c$ bears back against one of the steps $e$ the sliding frame B, that may be guided by plates $m$, is held from being thrown back by the spring E, and the stops $c$ and steps $e$ are so arranged that only one stop at a time, as will be hereinafter described, is arrested by a step $e$.

H is a spring-catch that serves to hold the handles $d$ in a vertical position when they and their plate-carrying frames are turned up.

I is the focusing-lever, and J the graduated arc which regulates its adjustment.

K K' indicate the finder with its lens.

The operation of the instrument is as follows: The plate-holder A is slid like a drawer into the lower part of the camera. The sensitized plates, of which one $n$ only in Fig. 3 is shown, are secured in their pivoted frames D, so that they can be swung up one after another like the leaves of a book. In this way the plates can be brought one at a time into position opposite the lens in rapid succession by simply lifting the handles $d$, which project from the side of the plate-holder. To insure the distance always being the same from the lens F to the plate under exposure, the plate-holder A is carried, as hereinbefore described, in the sliding frame B, which, as the proper handle $d$ is lifted from its engagement with its step $e$ in the plate G, recedes from the lens the proper amount each time a sensitized plate is brought up, the spring E operating to thus recede the frame B. Said frame is prevented from sliding backward farther than it should by the stops $c$ on the handles $d$ engaging with the steps $e$ in the plate G. The spring-connection $f$ prevents the plate G from moving back with the plate-holder. The steps $e$ in the plate G and the projections or stops $c$ on the handles $d$ are so arranged that only the one stop $c$ on the uppermost handle lying in a horizontal position is in contact with its step $e$ in the plate G, while the stop on the horizontal handle $d$ just below it is just the distance from the back of its step in the plate G as the thickness of a plate-carrying frame D. When, however, the upper one of these horizontal handles $d$ is lifted, the plate-holder A slides back till contact is made by the stop on the horizontal handle just below the upper one with the step $e$ below. Thus the necessary backward movement of the plate-holder is controlled to bring each raised plate in succession the same distance from the lens. As the handles $d$ of the plate-carrying frames are turned up they are held in position by the catch H. This catch has a projection $a'$ for lifting the catch by the finger when it is desired to release the handles, and when released they will resume their original horizontal positions if the plate-holder A be pushed forward. Two or more of the handles $d$ can be raised at the same time without interfering with the requisite adjustment of the front raised plate from the lens, which will be made correctly every time; hence the plates can be used in any desired order. The lens F is focused as required by moving the lever I long the arc J, which is suitably graduated to indicate different distances. This lever is connected, as shown, with a board to which the lens is attached and moves it backward and forward.

Having thus described my invention, what I claim as new, and desire to secure by Letters Patent, is—

1. In a photographic camera, the combination, with the camera-box, of the plate-holder A, fitted to slide as a drawer in the bottom of said box, and a series of plate-carrying frames D, hinged or pivoted to said holder, substantially as shown and described.

2. The combination, with the camera-box, its interior sliding frame B, and plate-holder A within said frame, of the series of plate-carrying frames D, hinged or pivoted to the holder and provided with handles $d$, having stops or projections, the stepped stationary plate G, adapted to engage one step at a time with the stops on the handles of the plate-carrying frames which are out of exposing position, and a spring operating to press the plate-holder back, whereby the plate-holder is moved back as the plates are swung up into position and the distance from the lens of the instrument to each or any of the raised plates in succession remains constant, essentially as herein set forth.

GEORGE S. MOLER.

Witnesses:
EDWARD L. NICHOLS,
F. C. FOWLER.